United States Patent [19]
Lai

[11] Patent Number: 5,664,994
[45] Date of Patent: Sep. 9, 1997

[54] PAIR OF FISH-HOLDING TONGS

[76] Inventor: Tsan-Chao Lai, No.20-3, Alley 36, Lane 459, Section 1, Road An Her, City Tainau, Taiwan

[21] Appl. No.: 685,300
[22] Filed: Jul. 23, 1996
[51] Int. Cl.[6] .................................................. A22C 25/08
[52] U.S. Cl. .......................... 452/185; 452/132; 81/424.5
[58] Field of Search ............................... 452/185, 132; 81/300, 302, 415, 418, 420, 424.5

[56] References Cited

U.S. PATENT DOCUMENTS

| | | | |
|---|---|---|---|
| 1,586,645 | 6/1926 | Bierman | 81/424.5 |
| 1,949,452 | 3/1934 | Chadwick | 81/424.5 |
| 3,921,327 | 11/1975 | Casazza | 452/185 |
| 4,386,542 | 6/1983 | Verna | 81/420 |
| 4,663,806 | 5/1987 | Mangum | 452/195 |
| 4,710,998 | 12/1987 | Gast | 452/132 |

FOREIGN PATENT DOCUMENTS

| 14845 | 7/1911 | Denmark | 452/195 |
|---|---|---|---|

Primary Examiner—Willis Little
Attorney, Agent, or Firm—Pro-Techtor International

[57] ABSTRACT

The present invention concerns a pair of fish-holding tongs, designed to be a practical tool for sport fishermen to immobilize their catch. The pair of fish-holding tongs of the present invention is fabricated of a metallic or plastic material, comprising components shown in the attached FIGS. 1 to 8. The inventor arrived at the present invention after observing that many sport fishermen hold their catch with their hands and that the struggling fish, particularly those equipped with sharp spines for defense purposes and those capable of fighting fiercely, such as ray, tiger fish and sea eel, can cause painful hand injuries. Specifically, the pair of fish-holding tongs is designed so that fish of different shapes can be immobilized easily from different angles, thereby preventing the struggling fish from escaping or injuring the hands of the sport fisherman.

3 Claims, 8 Drawing Sheets 5,664,994

1

PAIR OF FISH-HOLDING TONGS

BACKGROUND OF THE INVENTION

The present invention concerns a pair of fish-holding tongs, designed to be a practical tool for sport fishermen to immobilize their catch. The inventor arrived at the present invention after observing that many sport fishermen hold their catch with their hands and that the struggling fish, particularly those equipped with sharp spines for defense purposes and those capable of fighting fiercely, such as ray, tiger fish and sea eel, can cause painful hand injuries. Specifically, the pair of fish-holding tongs is designed so that fish of different shapes can be immobilized easily from different angles, thereby preventing the struggling fish from escaping or injuring the hands of the sport fisherman.

DESCRIPTION OF THE PREFERRED EMBODIMENT

The fish-holding tongs of the present invention is made of a metallic or a plastic material. Examples of suitable metallic materials include galvanized steel plate and aluminum alloys. Examples of plastic materials that can be used include acrylonitrile butadiene styrene (ABS), polypropylene (PP), polycarbonate (PC), plastic materials reinforced with a fiber, plastic materials reinforced with glass fiber, fiber-reinforced nylon, and engineering plastics. When galvanized steel plate is used, the pair of fish-holding tongs can be fabricated by stamping, using a steel die. When an aluminum alloy is used, the pair of fish-holding tongs can be fabricated by casting, using a steel mold. When a plastic material is used, the pair of fish-holding tongs can be fabricated by injection molding, using a steel mold. A one-piece design can be fabricated from aluminum alloys, which involves casting, or from plastic materials, which

2 involves injection molding. The manufacturing process using the above-mentioned materials also requires other steps, such as welding, assembling, fastening, inserting and finishing steps.

Figure 1:
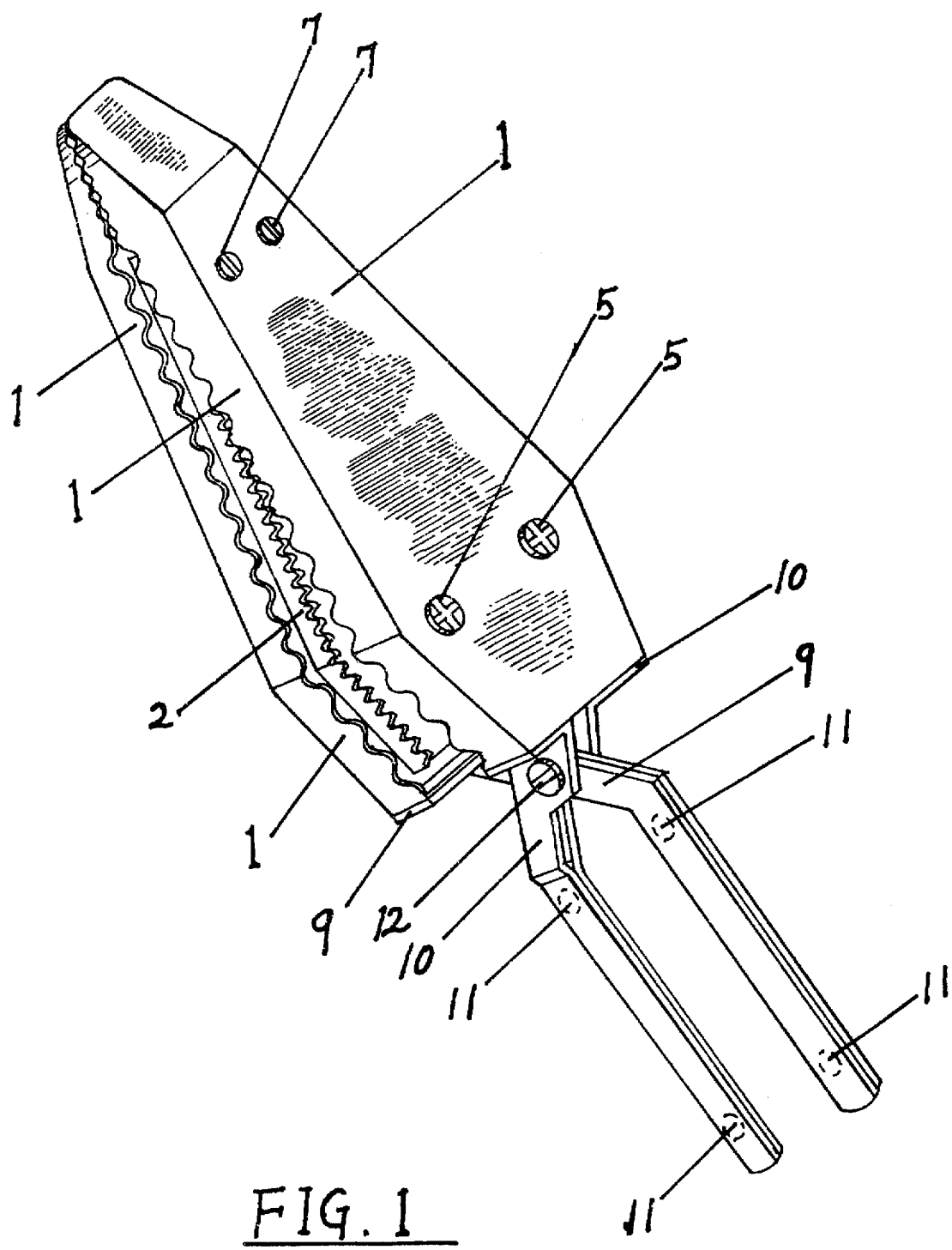
FIG. 1. is a three-dimensional view from an angle of the pair of fish-holding tongs of the present invention to reveal its overall design.
Figure 2:
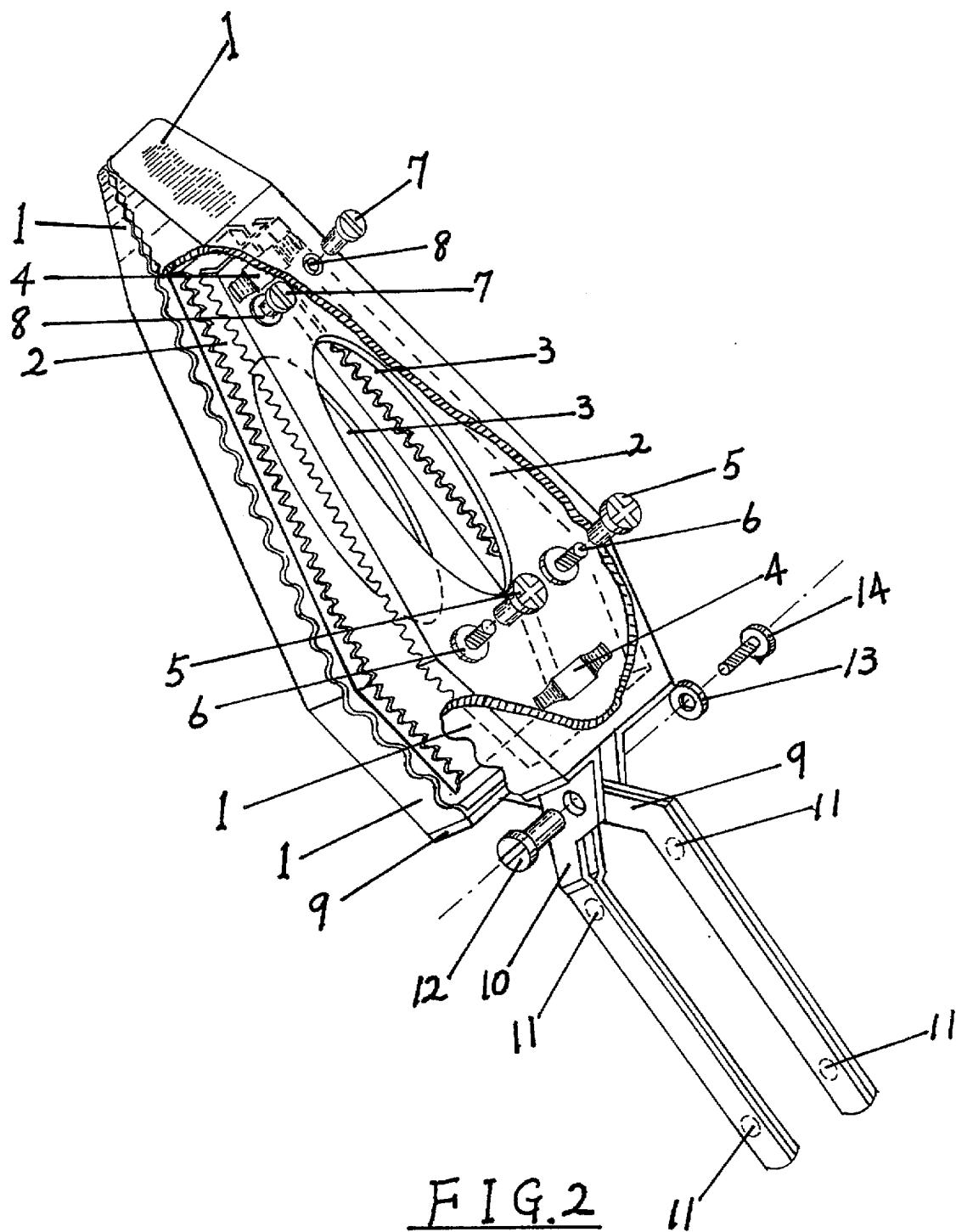
FIG. 2. is a cut-way three-dimensional view from an angle of the pair of fish-holding tongs of the present invention to demonstrate the assembly process.
Figure 3:
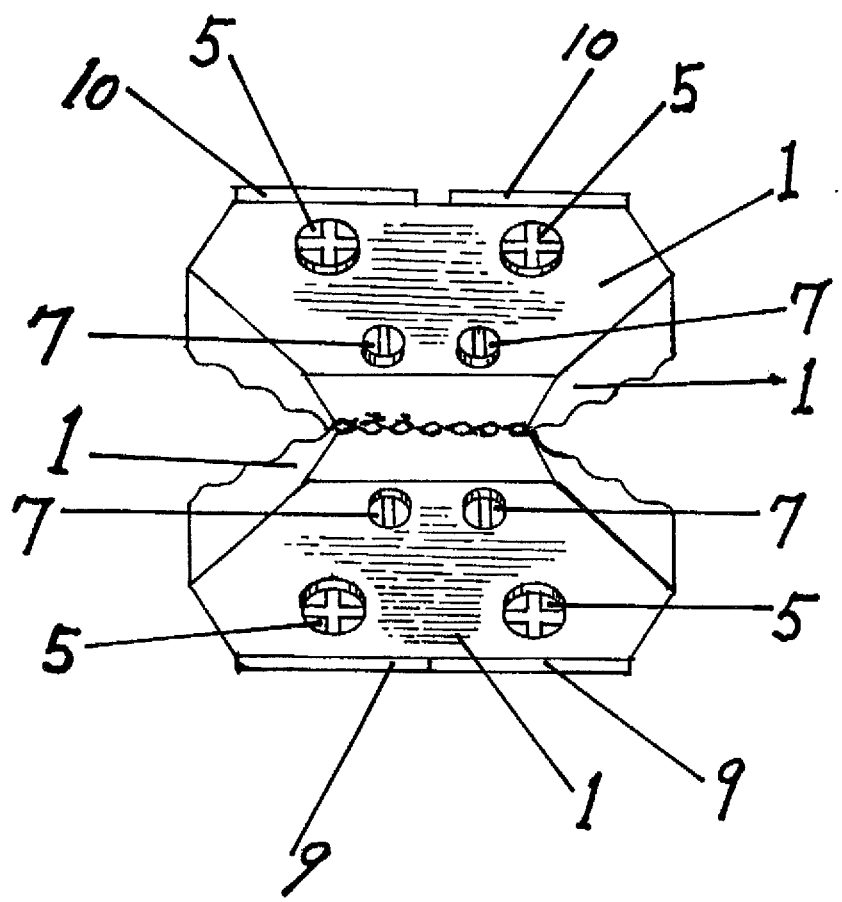
FIG. 3. is a front view of the pair of fish-holding tongs of the present invention.
Figure 4:
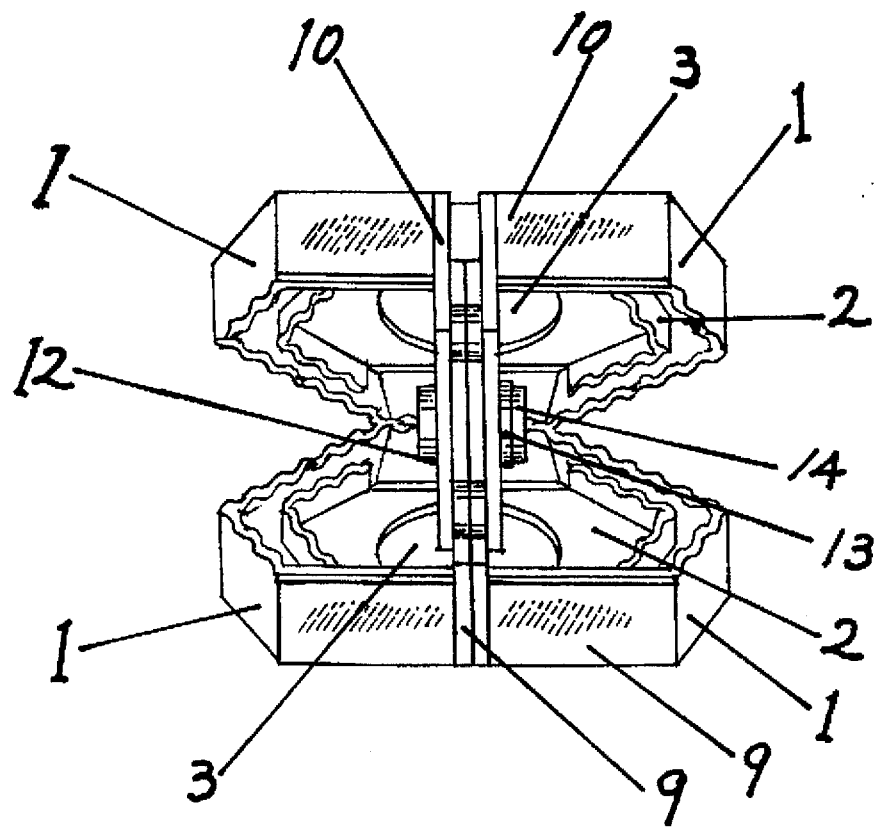
FIG. 4. is a rear view of the pair of fish-holding tongs of the present invention, showing the various components and the combined structural function.
Figure 5:
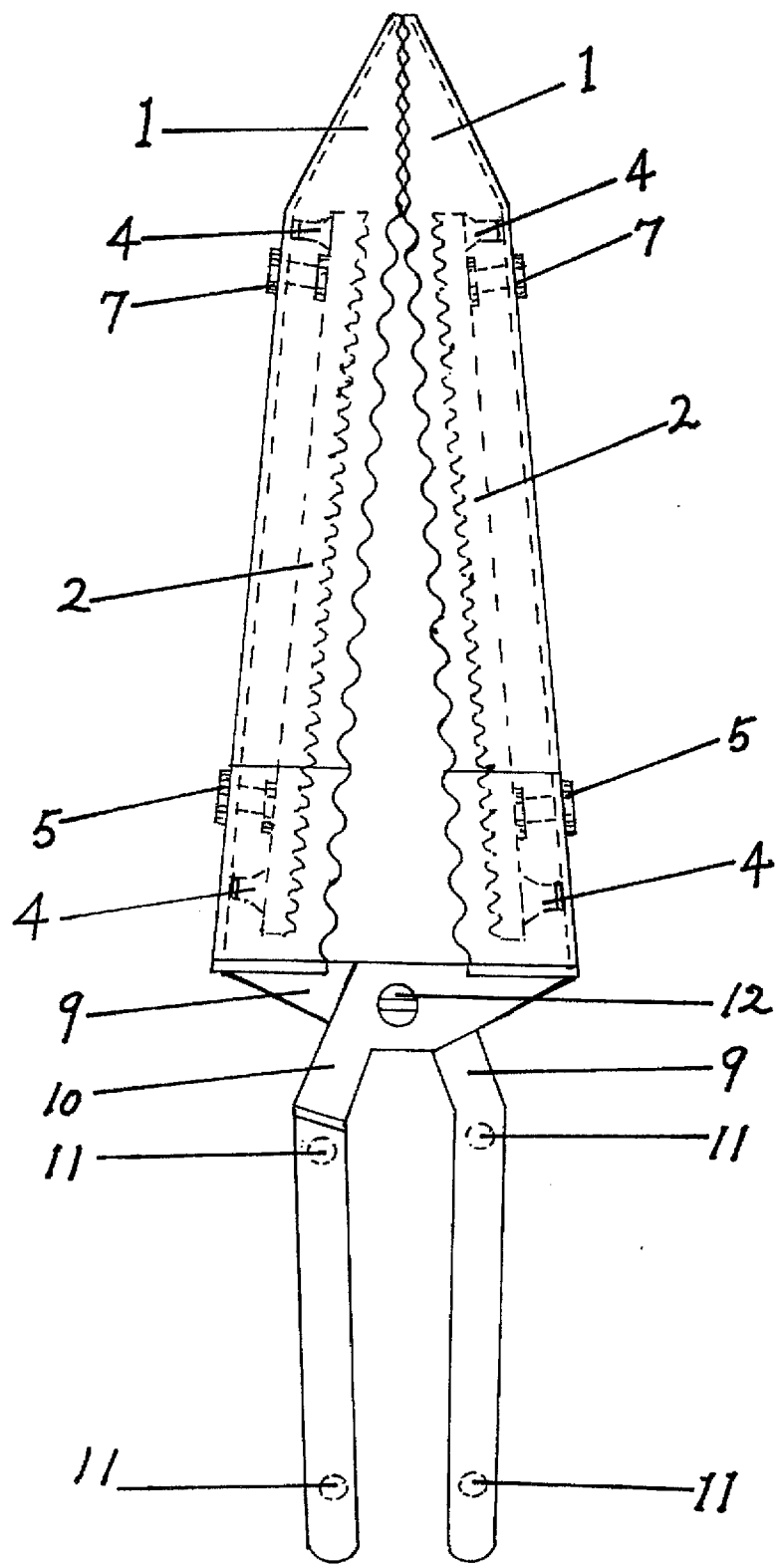
FIG. 5. is a left-side view of the pair of fish-holding tongs of the present invention, which shows the various interior components and the combined structural function as depicted by the dotted lines, and the serrated edges. This figure shows the characteristics of the novel design of the present invention.
Figure 6:
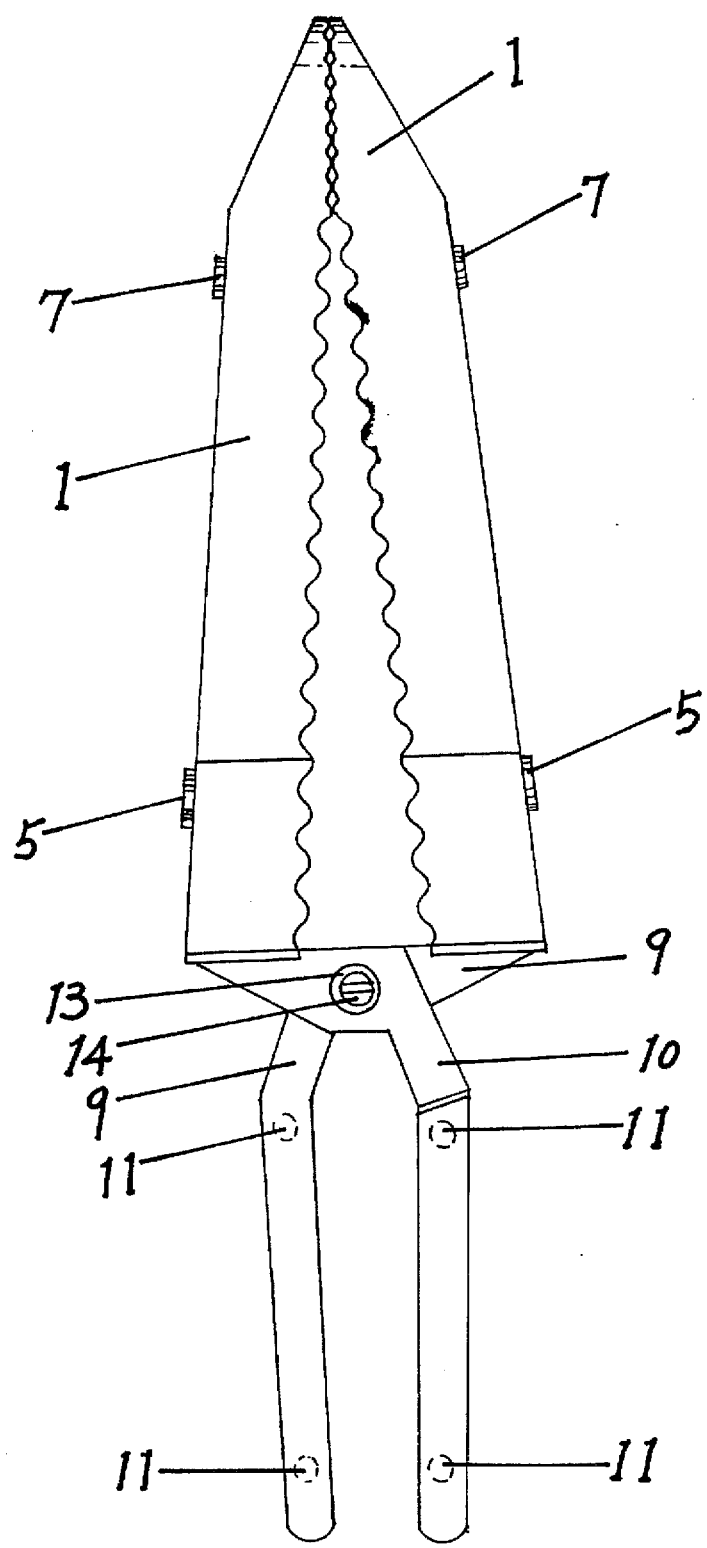
FIG. 6. is a right-side view of the external appearance of the pair of fish-holding tongs of the present invention, and shows that both sides are essentially identical.
Figure 7:
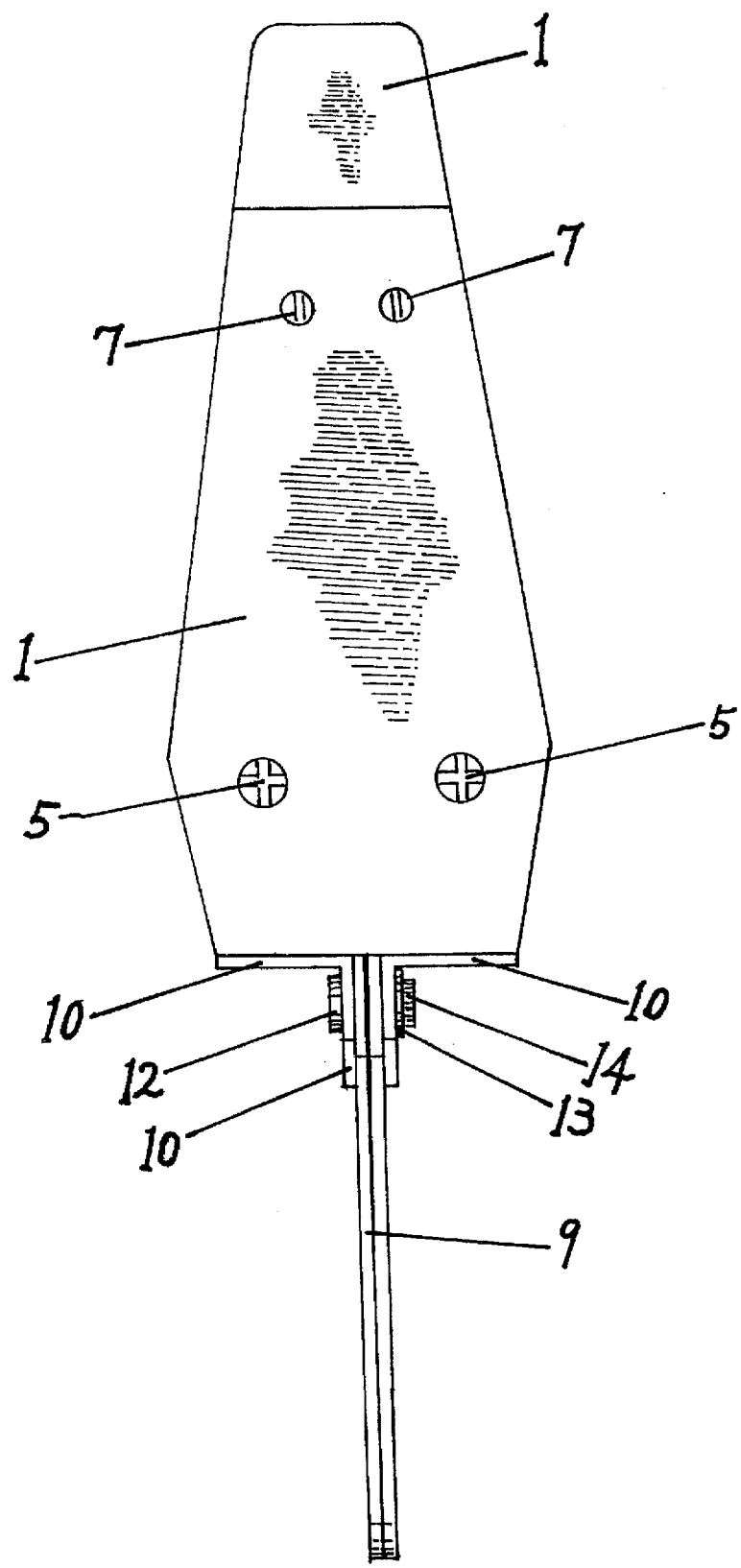
FIG. 7. is an upper view of the external appearance of the pair of fish-holding tongs of the present invention and shows the various components as seen from the top.
Figure 8:
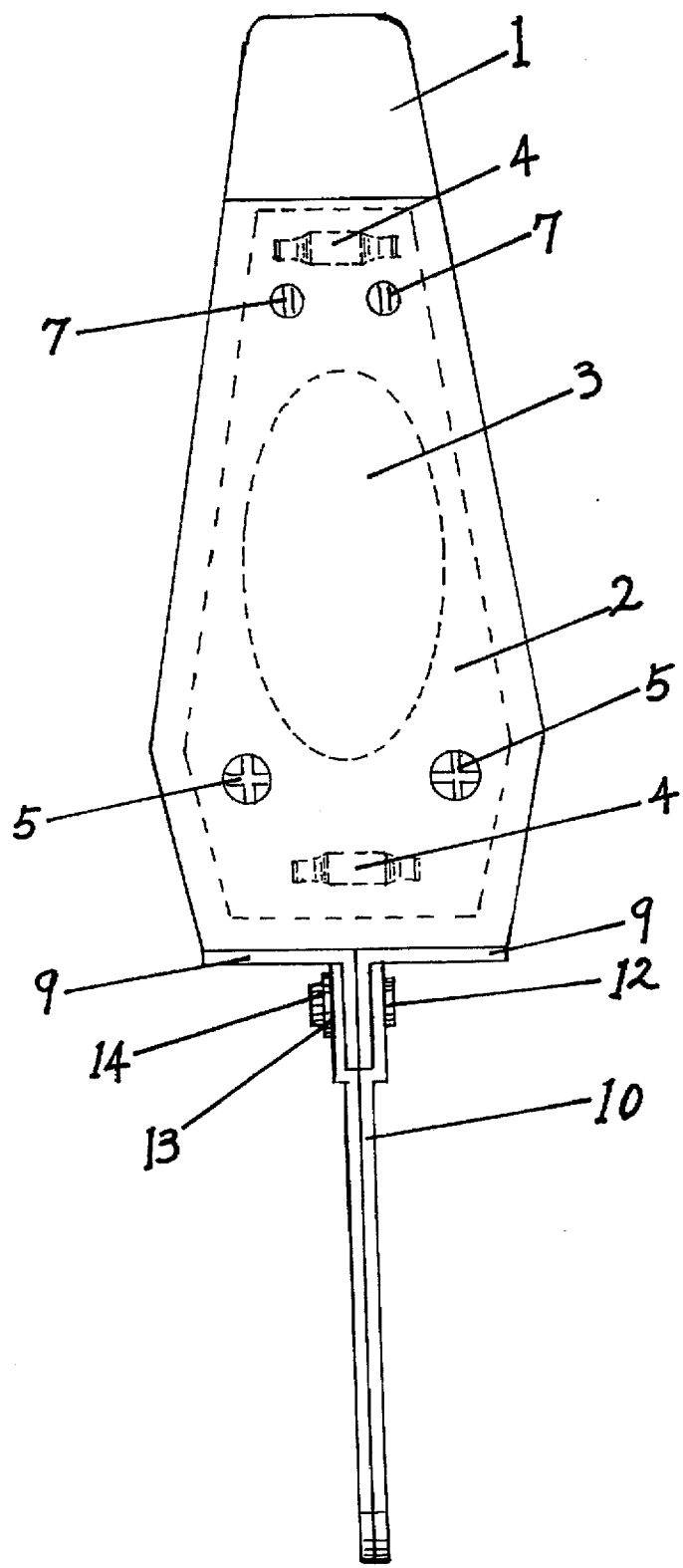
FIG. 8. is a bottom view of the pair of fish-holding tongs of the present invention, showing that the pair of tongs are of the same size and shape; the dotted lines show the structural configuration of the characteristic interior components.

The crocodile head piece 1 shown in FIG. 2 (a cut-away figure), in FIG. 5 (a left side-view figure) and in FIG. 8 (a bottom-view figure) is fabricated by stamping a piece of galvanized steel plate, using a standard mold, so that the crocodile head piece 1, which is shaped like a crocodile head, is of one size and can be produced serially in large numbers. Separately, a male tong handle 9 and a female tong handle 10 are fabricated by stamping and welding. These male tong handle 9 and female tong handle 10 are then welded onto the rear side of separate crocodile head pieces 1, thereby forming scoop-like objects. The two sides of the crocodile head piece 1 are serrated to facilitate the fish-gripping action. A serrated plate 2 is fabricated by stamping. The center of the serrated plate 2 is hollow (see 3), as shown in FIG. 2 (a cut-away figure) and in FIG. 8 (a bottom-view figure), and the rim of the serrated plate 2 is folded and serrated so that the fish caught can be entrapped inside the cavity formed between the two serrated plates 2, which have a hollow center. The serrated crocodile head pieces 1 together with the serrated plates 2 allow a fisherman to immobilize a fish effectively. The front and rear sections of the back side of the serrated piece 2 are each equipped with a spring piece 4 installed at an appropriate location, as shown in FIGS. 2 and 5. Furthermore, there are four screws welded onto the back side of the serrated piece 2, as shown by the Philip screws 6 and the slotted screws 8, and there are a set of corresponding female Philip screws 5 and a set of corresponding female slotted screws 7. The serrated piece 2 is fastened onto the crocodile head piece 1 by inserting the four female screws 5 and 7 into the corresponding screws 6 and 8. The four female screws 5 and 7 can slide vertically inside the crocodile head piece 1, and function in conjunction with the spring pieces 4, which are installed between the crocodile head piece 1 and the serrated piece 2, to generate a spring action that varies in accordance with the force exerted by the struggling fish held between the crocodile head pieces 1. Thus, the device of the present invention is also designed to possess spring dampening actions. The male tong handle 9 and female tong handle 10 are joined using a pin to form a pair of tongs with gripping functions as shown in FIG. 1 (a stereo view) and in FIG. 2 (a cut-away view). In addition, the two serrated plates 2 in conjunction with the hollow center 3 form an elliptical cavity. Furthermore, each tong is equipped with four rows of serrated edges, thereby providing the pair of tongs of the present invention with a total of eight rows of serrated edges with which a fish of any shape can be immobilized and prevented from escaping, as shown in FIGS. 2, 5, 6 and 8. The device of the present invention is titled "A Pair of Fish-holding Tongs".

I claim:

1. A pair of fish-holding tongs comprising:
   two opposing outer head pieces, said head pieces include on an inner side thereof a series of fine raised rounded projections at a first, distal end and a series of larger raised rounded projections along the remaining periphery of said head pieces,
   each head piece comprises an inner plate affixed to a central portion of said inner side of said head pieces, each said head pieces is joined with one of said inner plates to form a head piece/inner plate combination, said inner plates comprise a series of raised rounded projections spaced apart from said rounded projections on each said head piece, said inner plates further include an open elliptical space in a central region thereof, such that when said opposing head pieces are placed in a closed position, a spherical cavity is formed between said inner plates, and a pair of handles to open and close said head pieces; wherein said inner plates are mounted on said head pieces with adjustable spring means situated between said head pieces and said inner plates, such that pressure exerted by said inner plates is changed by a user of said tongs altering an adjustment mechanism of said spring means, said adjustment mechanism is included in each of said head piece/inner plate combination.

2. The pair of fish-holding tongs as claimed in claim 1 wherein:

said adjustment mechanism comprises a first fastener rotatably secured in the head piece of each said head piece/inner plate combination, and a second fastener secured in the inner plate of each said head piece/inner plate combination, said first fastener and said second fastener are joined by threaded elements; such that tension provided by said spring moistness of said inner plates is varied by rotating said first fasteners.

3. The pair of fish-holding tongs as claimed in claim 1 wherein:

said adjustment mechanism comprises a first fastener rotatably secured in the inner plate of each said head piece/inner plate combination, and a second fastener secured in the head piece of each said head piece/inner plate combination, said first fastener and said second fastener are joined by threaded elements; such that tension provided by said spring moistness of said inner plates is varied by rotating said first fasteners.

* * * * *